United States Patent
Montrose et al.

(10) Patent No.: US 9,877,155 B1
(45) Date of Patent: Jan. 23, 2018

(54) SYSTEM AND METHOD FOR EMPLOYING BASE STATIONS TO TRACK MOBILE DEVICES

(71) Applicant: Numerex Corp., Atlanta, GA (US)

(72) Inventors: Rodney C. Montrose, Allen, TX (US); Jeffrey O. Smith, Dallas, TX (US)

(73) Assignee: NUMEREX CORP., Atlanta, GA (US)

( * ) Notice: Subject to any disclaimer, the term of this patent is extended or adjusted under 35 U.S.C. 154(b) by 29 days.

(21) Appl. No.: 14/538,569

(22) Filed: Nov. 11, 2014

Related U.S. Application Data

(60) Provisional application No. 61/902,503, filed on Nov. 11, 2013.

(51) Int. Cl.
*H04W 4/02* (2009.01)
*H04W 88/10* (2009.01)

(52) U.S. Cl.
CPC ............ *H04W 4/023* (2013.01); *H04W 88/10* (2013.01)

(58) Field of Classification Search
CPC ........ G06Q 10/087; G06Q 10/08; G01S 1/68; H04W 4/02; H04W 64/00
See application file for complete search history.

(56) References Cited

U.S. PATENT DOCUMENTS

| | | | | |
|---|---|---|---|---|
| 6,339,397 B1* | 1/2002 | Baker | ................... | B61L 25/021 342/357.64 |
| 7,323,991 B1* | 1/2008 | Eckert | ................. | G07C 9/00111 235/382 |
| 2006/0190165 A1* | 8/2006 | Makela | ..................... | G01S 5/02 701/517 |
| 2008/0031194 A1* | 2/2008 | Yaqub | ................... | H04L 63/062 370/331 |
| 2009/0163201 A1* | 6/2009 | Wormald | ............ | H04L 29/1216 455/426.2 |
| 2011/0065379 A1* | 3/2011 | Sakoda | ................... | H04B 7/155 455/7 |
| 2011/0195701 A1* | 8/2011 | Cook | .................... | G01S 5/0018 455/422.1 |
| 2012/0039240 A1* | 2/2012 | Han | ....................... | H04B 7/155 370/315 |
| 2012/0239493 A1* | 9/2012 | Zughaib | ................. | G06Q 50/28 705/14.49 |

* cited by examiner

*Primary Examiner* — Nathan Mitchell
*Assistant Examiner* — Ernest Tacsik
(74) *Attorney, Agent, or Firm* — King & Spalding LLP

(57) ABSTRACT

The invention described is a system and method for tracking assets. Mobile devices on the assets communicate their location to a central station. When the mobile devices are in an area with interference or no network then the mobile devices connect to a base station. The base station in turn can communicate with the central station and report on the locations of mobile devices connected to that base station. The base stations can be placed in areas such as warehouses, mines or other locations.

17 Claims, 7 Drawing Sheets

SYSTEM AND METHOD FOR EMPLOYING BASE STATIONS TO TRACK MOBILE DEVICES

CROSS REFERENCE TO RELATED INFORMATION

This application claims the benefit of U.S. Provisional Patent Application No. 61/902,503, filed Nov. 11, 2013, titled, "System and Method for Employing Base Stations to Track Mobile Devices", the contents of which are hereby incorporated herein in its entirety.

TECHNICAL FIELD

The present disclosure is directed to asset tracking and more particularly to tracking mobile devices by means of base stations in areas of high interference or poor coverage.

BACKGROUND OF THE INVENTION

Telecommunications technologies provide users with great tools and communication capabilities. Especially when implemented on mobile devices, telecommunications has allowed users to enjoy great connectivity whether it be by phone, internet, text messaging, emails and more. One aspect of telecommunications is geo-location. Mobile devices can locate themselves using various technologies. Wireless networks (such as Wi-Fi®) often have a geographical location coded into its router. Cellular services also provide geo-location capabilities. One of the most common geo-location technologies is the Global Positioning System (GPS). Different telecommunications and geo-location technologies use a variety of electromagnetic, radio, acoustic, and other communications platforms. Other areas of the world may use different technologies such as the Galileo positioning system in Europe, the Indian Regional Navigation Satellite System in India, and the Beidou Navigation Satellite System in China, among others.

GPS relies on satellites positioned high above the Earth. These satellites constantly transmit messages. The messages include 1) when the message was sent, and 2) the satellite position when the message was sent. GPS receivers on the ground receive this data and can calculate their distance to a satellite using the speed of light. When a GPS receiver knows its distance from multiple satellites it can determine an intersection point, i.e. its location. In practice GPS receivers usually need measurements from four or more GPS satellites to provide an accurate location. Typically, a GPS receiver on the ground has access to eight or nine GPS satellites at any given time.

Wireless (such as Wi-Fi®) and cellular networks have geo-location capabilities that function differently than GPS. A wireless (such as Wi-Fi®) or cellular device may have a MAC (media access control) address, a unique identifier, that can be used for location purposes. Cellular devices can connect to cellular base stations. The network operator, or other entity, may then be able to locate a cellular device by knowing what base station the cellular device is within the range of. A device may also have a unique IP address and this can be used to find the device's location.

Telecommunications and geo-location services can see their usefulness decline when there is interference. Some technologies or radio waves depend on line-of-sight, meaning that a transmitter and receiver must be in line-of-sight to each other because the communication waves used will generally not travel around obstacles. Obstacles can include buildings, cars, hills, mountains, the curvature of the earth and other objects. Some telecommunications systems are not limited to line-of-sight, but buildings, hills and the like can still cause interference due to electromagnetic waves bouncing off the objects and going in various directions. A particular difficulty can arise when user with a mobile device is inside of a building. Cellular, GPS and other networks can have a hard time communicating due to the interference caused by the walls and floors of the building. The amount of interference can depend on the construction materials in the building, distance from a transmitter, and other factors.

GPS systems are prone to interference problems when a user is inside a building. When a satellite device is blocked from access to the sky (e.g. inside a warehouse, plane, factory) it cannot report its location and often it cannot receive the GPS signal. The satellite unit tries to get GPS data and send satellite or radio messages, needlessly draining it's battery for messages that never will be received. For a one-way satellite device, it doesn't know that its messages are not being received or that it's in a location where it cannot receive GPS or send messages.

Some mobile devices try to overcome interference problems by implementing multiple geo-locations services. If a user is inside a building and can't access GPS, then the geo-location services of cellular networks will be used. If cellular is unavailable then Wi-Fi geo-location may be available, etc. Various of these technologies have different margins of error. For instance a user may want to solely use the accuracy of the GPS system, even when located inside a building. Businesses may use geo-location to monitor employees or vehicles and may wish to rely on GPS instead of cellular geo-location. Therefore a system is needed that can help extend the reach of GPS or other geo-location systems to the inside of buildings or other locations.

A system is also need with multiple geo-location functionalities, such that if one system is down or a device is out of coverage then back-up systems can take over and provide location to a user trying to track inventory or devices of some kind.

BRIEF SUMMARY OF THE INVENTION

One embodiment of the invention comprises at least one base station. The base station(s) comprise a first communications interface and a second communications interface, the first communications interface operable to communicate with a central station. The central station is operable to maintain a list of a plurality of mobile devices and their locations. The second communications interface is operable to communicate with the plurality of mobile devices wherein the plurality of mobile devices can communicate their location to the central station. When a communications network is unavailable the mobile devices can connect to the base station(s) and the base station(s) can communicate the location of connected mobile devices to the central station.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
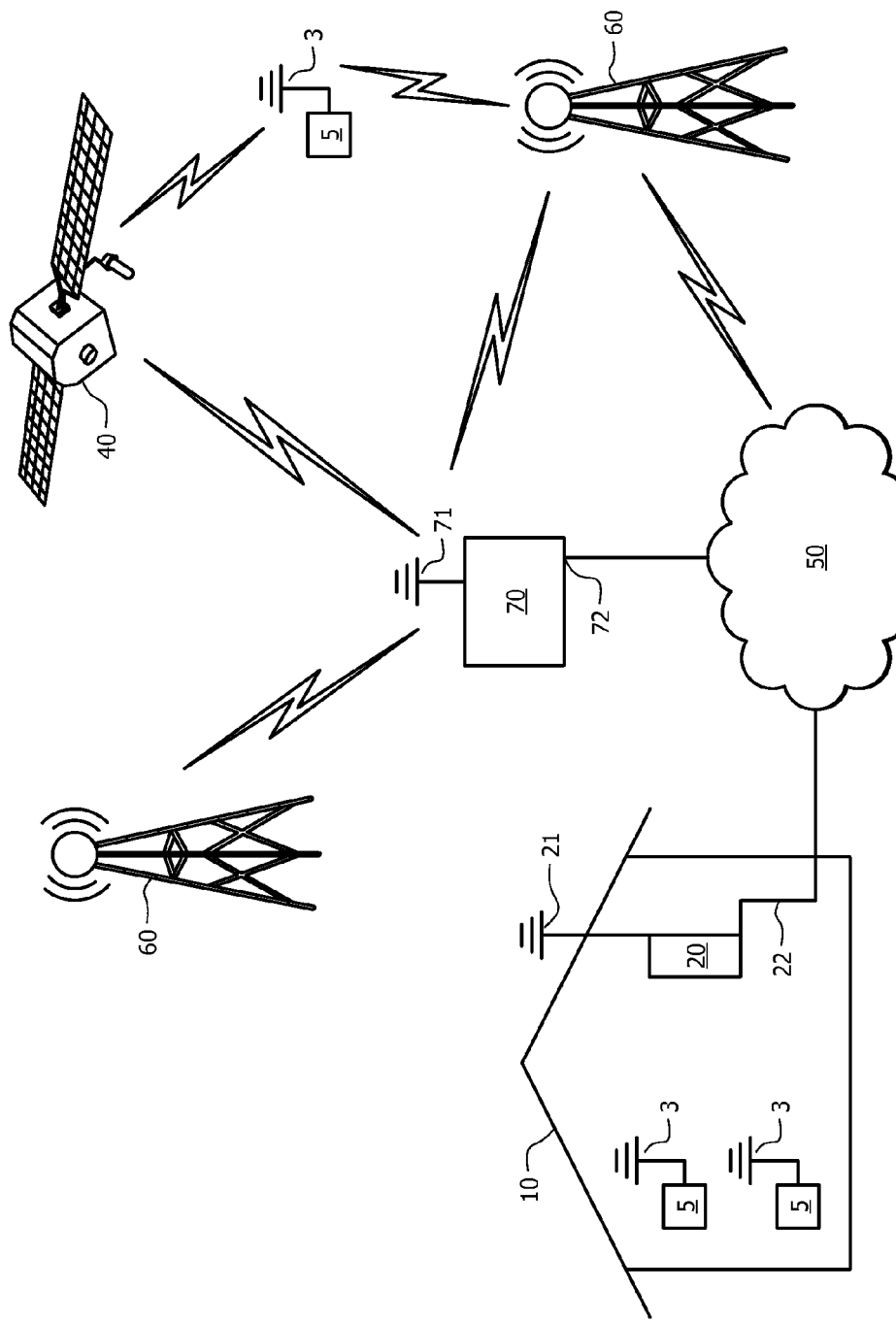
FIG. 1 is a diagram of the invention in an embodiment with one warehouse.

The invention described is a system that can be used for monitoring large inventories in locations such as warehouses that might have poor cellular or other wireless connectivity. The invention as described can have other uses and can be used in a variety of situations where a telecommunications network must be extended into an environment with poor connectivity. The invention can provide a fixed communications device at a known location that will communicate and enumerate the satellite devices it hears and simulate the satellite devices reporting. In addition, the satellite devices could be programmed to enter into a power saving mode where they wouldn't try to acquire GPS signals or transmit to the satellites. The fixed device could also allow quasi two-way communication and configuration of one-way satellite devices by allowing the fixed device to receive remote commands and change one way satellite devices over the ISM radio band.

Various embodiments of remote monitoring/data collection devices have modes where the device periodically looks for a radio/satellite/Wi-Fi/other signal, such as for example on the 900 MHz ISM radio. If these remote devices see a steady carrier they can call out identifying information such as their serial number (ESN). This is how a central station identifies and finds these remote devices.

Using a fixed base station located in enclosed areas, such as warehouses, containers, planes, etc., where the remote device has no other access, the base station can emulate a central station trying to find the remote devices. It finds devices that are within the enclosed area and keeps an internal record of the remote devices it finds. As it receives identifying information, the base station tells the remote devices to stop transmitting for a period to allow it to receive signals from other remote devices. The base station will connect to the central station and perform a device report with the identifying information for each remote device and location (i.e. GPS Lat and Long). The location information can either come from the base station's GPS or can be hard coded for a specific location. In this way the remote devices don't need to see the GPS satellite or communicate with the communications satellite/radio/Wi-Fi/other.

When the remote device is in Power Saving mode (so it doesn't spend time or battery energy getting a GPS or communicating with the communications network), the short range radio mode (used for programming and configuration) is still active and the base station can communicate with the remote device. The base station can choose how often to simulate the device's reporting message to the central station—sending a communication to the central station giving a device's location. Even though it may enumerate the remote devices twice a day, it may choose to only report new devices immediately and older, known devices once a week.

The base station can allow remote reprogramming of remote devices in the field, which would allow two-way communication with the devices. A gateway with the remote device parameters could be introduced to allow remote setting of report rates, geo fences, etc. when the remote device was in range of a base station. The system can also use a few of the unused bits on the remote device's messaging protocol to report when a new device is seen, if a device is no longer communicating.

Devices that have been put into power saving modes could have various mechanisms for detecting movement out of range of a base station. Motion detectors could detect any movement and immediately take the device out of power saving mode. Periodic checks of the availability of certain satellite or radio signals could indicate to the device when it has been moved.

Referring now to FIG. 1, a preferred embodiment is seen. In this embodiment a warehouse 10 contains multiple mobile devices 5. The mobile devices 5 can be any kind of inventory or something to be tracked. The mobile devices 5 can integrated into an item of inventory, or the mobile devices 5 can be temporarily attached, a variety of configurations are possible. However, within the warehouse 10, the mobile devices 5, with antennas 3, have limited connectivity to cellular towers 60 or satellite 40. The user of the system wishes to track mobile devices 5 and keep records in central station 70 of the locations of the mobile devices 5. Mobile devices 5 that are not within warehouse 10 are able to communicate by means of their antenna 3 to telecommunication systems such as cellular towers 60 or satellites 40 and report their location to central station 70. Cellular towers 60 and satellites 40 can communicate with central station 70 in a variety of ways. Central station 70 may have an antenna 71 in direct communication with satellites 40 or cellular towers 60 or it may be connected by hard line connection 72 to any of a variety of networks 50 such as the Internet, which in turn can be in communication with satellites 40 or cellular towers 60.

To accomplish the tracking of mobile devices 5 in warehouse 10, a base station 20 is placed in the warehouse 10. Inside the warehouse, the mobile devices 5 communicate with the base station 20 because they cannot communicate with cellular towers 60 or satellites 40. Base station 20 has an antenna 21 that is able to communicate with cellular tower 60 or satellite 40. Antenna 21 can be located on the exterior of warehouse 10, or it may be powered or have special geometric properties that enable it to communicate with cellular towers 60 or satellites 40. Base station 20 may also have a hard line connection 22 to an Ethernet or Internet connection to a network 50 such as the Internet or another network. As seen in this embodiment, mobile devices 5 can communicate, by means of antenna 3, to the base station 20, which in turns provides connection to the central station 70. Without the base station 20 the mobile devices 5 would be invisible to the central station. The invention can include the functionality of the mobile devices 5 entering a power saving mode when entering warehouse 10 wherein certain functionalities are turned off except for those needed to communicate with the base station.

Figure 2:
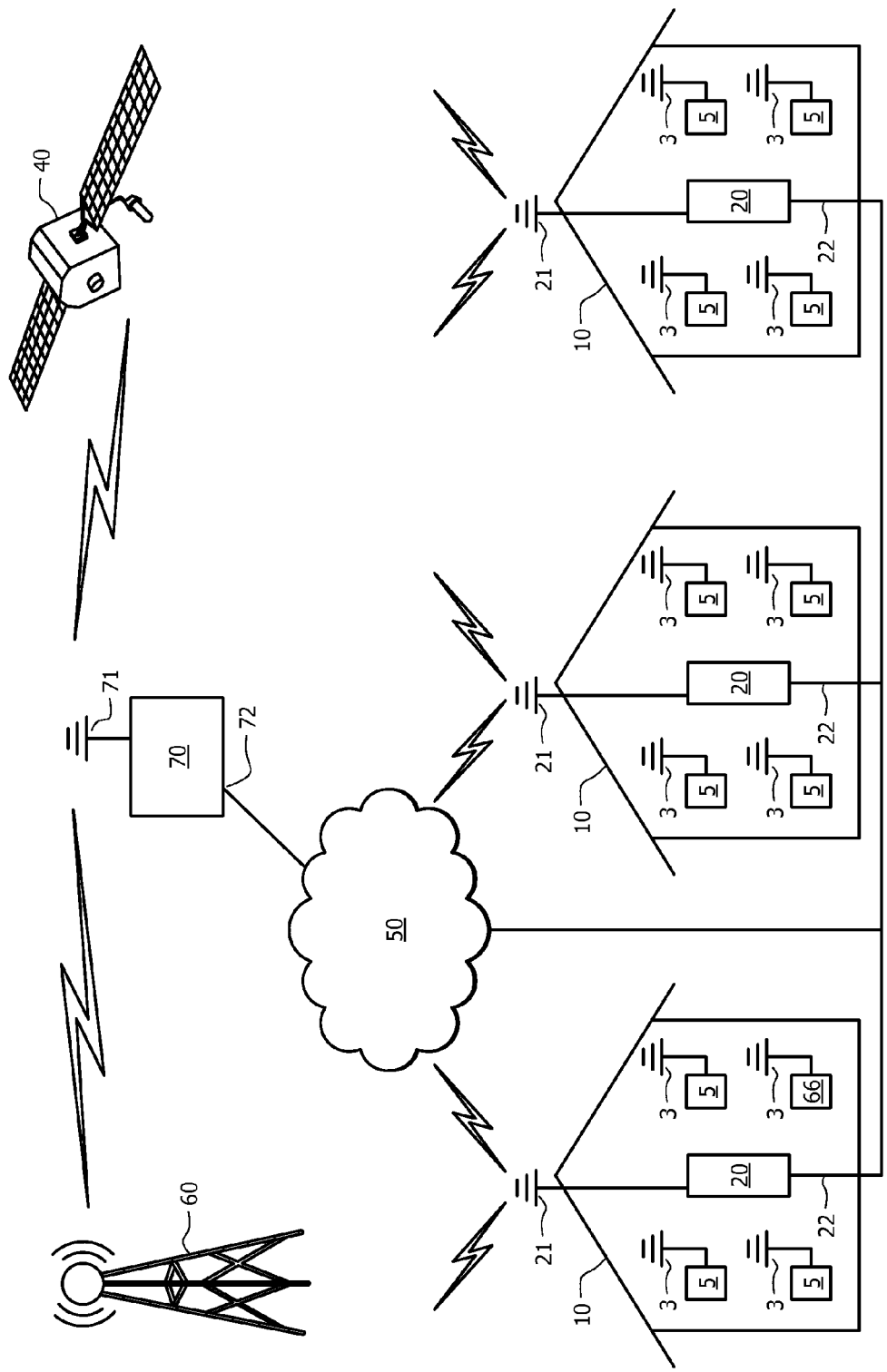
FIG. 2 is a diagram of the invention in an embodiment with multiple warehouses.

FIG. 2 shows another embodiment of the invention. This embodiment is similar to FIG. 1 but shows multiple warehouses 10. The invention may be particularly helpful where a user has multiple warehouses 10, possibly in various locales, and needs to track inventory of some form. As seen, multiple warehouses 10 can contain multiple mobile devices 5. Base stations within each warehouse 10 can provide connectivity between mobile devices 5 and central station 70. Base station 20 may use an antenna 21 for a wireless connection or hard line 22 for a wired connection. In this embodiment, the user may wish to locate a specific mobile device unit 66. Device 66 can send hourly, daily, or weekly updates on its location to central station 70. When the user wishes to located device 66 he can check central station 70 for the location. Alternately, the user can also ping device 66 when he wants to know its location.

Figure 3:
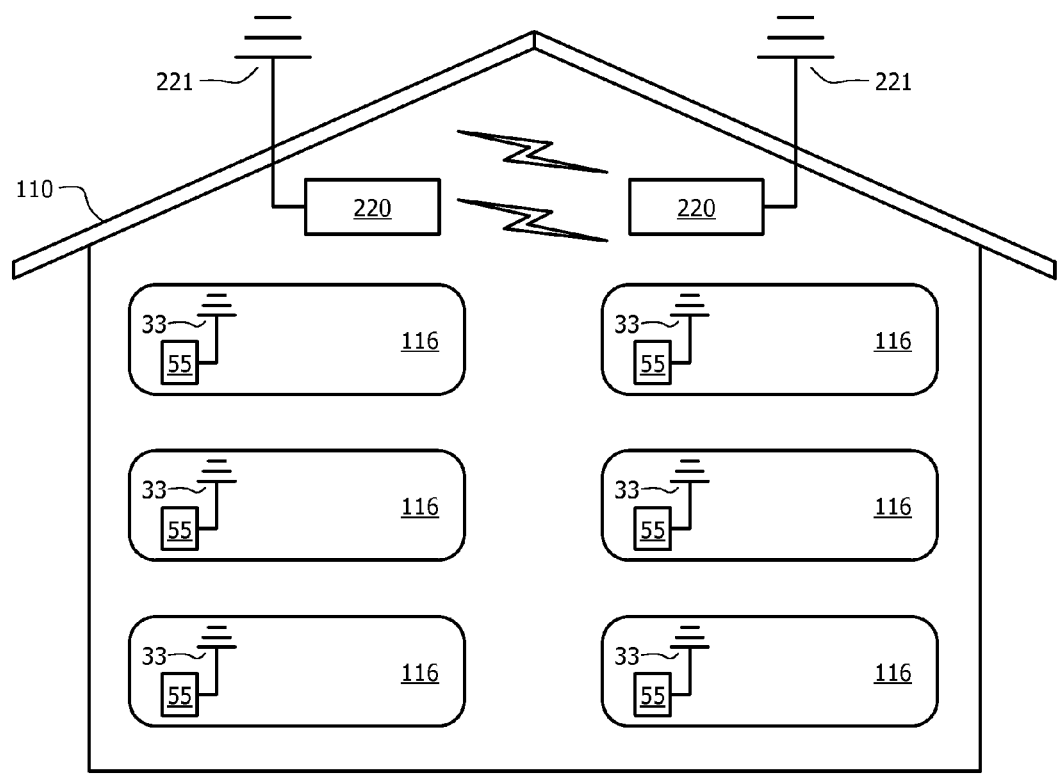
FIG. 3 is a diagram of an embodiment of the invention in the interior of a warehouse.

FIG. 3 shows a more detailed image of a possible warehouse 110 in an embodiment of the invention. In this embodiment the user hopes to track the location of tanks 116 of materials such as chemicals or oil. Each tank 116 has a mobile unit 55 with antenna 33 attached to it. In this embodiment the warehouse 110 has two base stations 220, each with an antenna 221. As in other embodiments, the base stations 220 are in communication with a central station by means of cellular towers, satellites, hard line, or any of a variety of network connections. Additional tanks 116 may be in other warehouses or in transit via semi-truck, shipping container, plane, train or another vehicle. Such tanks 116 may also have a mobile unit 55 and antenna 33 and are being tracked by a central station. As shown in FIG. 3, a warehouse may be large and may need multiple base stations 220. A base station 220 may have a range of several meters to several thousand meters. Depending on the size of the warehouse the user can implement multiple base stations 220 capable to communicate with mobile units 55. Base stations 220 may also be operable to communicate with each other. Base stations 220 may use a variety of communication technologies to talk to each other and to the mobile devices 55 within warehouse 110. Cellular, Wi-Fi, and other technologies can be implemented.

Figure 4:
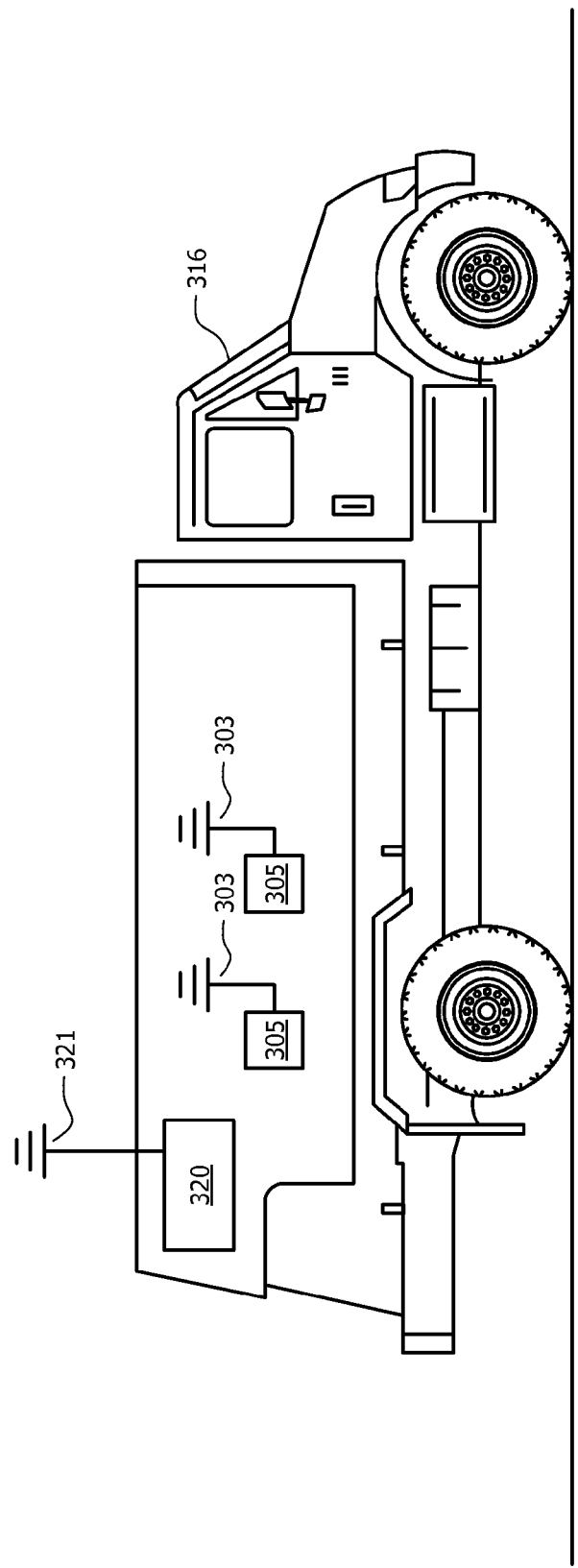
FIG. 4 is a diagram of an embodiment of the invention on a truck.

Another possible embodiment is on trucks. A user may wish to track items that are being shipped by truck. But a truck, because of its size or construction, may make it hard for mobile devices within to communicate. A similarly large object could be a shipping container which will also create interference problems. FIG. 4 shows an embodiment of the base station 320 on a truck 316. The truck is carrying mobile devices 305 with antennas 303 but within the truck the mobile devices have trouble communicating with the central station. By installing the base station 320 with antenna 321 the user can track the mobile devices 305. When the truck 316 pulls into a warehouse to deliver the items then the base station 320 can report a delivery to the central station or the mobile devices 305 can connect to a new base station at the warehouse.

Figure 5:
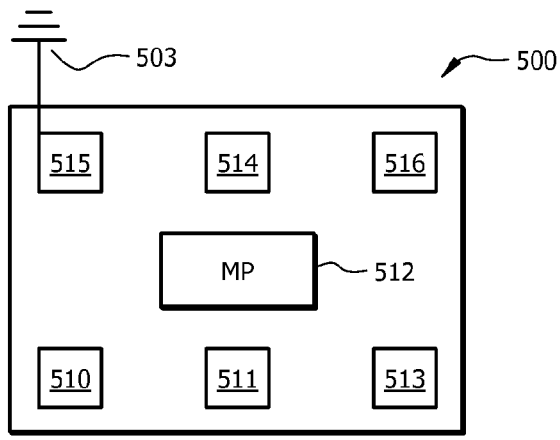
FIG. 5 is a block diagram of an embodiment of the mobile device of the invention.

FIG. 5 shows a typical mobile device 500 under the invention. The mobile device 500 will have a microprocessor 512, a radio interface 515 with antenna 503, memory 514, power supply 513 and possible further radio interfaces 510 and 511. In this embodiment the radio interface 515 is operable to communicate with a base station as described elsewhere in the specification. The memory 514 can store an operating system, instructions such as how often to report a location to the central station and other things. The power supply 513 powers the device and can be a battery of various types such as lithium ion, nickel cadmium, a battery with a connection to a solar panel and a variety of other battery setups. The mobile device 500 may also have several different radio interfaces 510 and 511. For example, the radio interface 515 for communicating with a base station may be based on the 900 Mhz ISM band, or it may use wireless (such as Bluetooth®, or Wi-Fi®), cellular, or a variety of other technologies. The mobile device in a preferred embodiment will also have separate radio interfaces 510 and 511. In a preferred embodiment radio interface 510 is a cellular interface such as 2G or 3G and interface 511 can comprise a GPS receiver.

The radio interfaces 515, 510 and 511 of mobile device 500 can comprise various arrangements. When the mobile device is outside of a warehouse or a mine and in a location with coverage, this radio interface 510 can be used to communicate with a cellular tower and communicate the mobile device's 500 location to the central station. Radio interface 511 can optionally be used as another communication system, such as for satellite communication such as GPS. The user wants to be able to locate the mobile device 500 no matter where it is so having multiple options for connectivity works to the user's benefit. Alternatively, some radio interfaces may be able to manage both cellular and satellite communication, so the interfaces 510 and 511 may be integrated into a single radio interface. It may also be possible to integrate radio interface 515 into a single interface with 510 and 511. In a preferred embodiment of the invention radio interface 515 is a wireless (such as Wi-Fi®) module, 510 is a cellular module, and 511 is a GPS module. When mobile device 500 is in a warehouse or otherwise out of coverage it communicates with a base station and can turn off its radio interfaces 510 and 511 to conserve power. These and other functionalities can be powered off in a power saving mode to conserve power, perhaps during a long term storage. When the mobile device 500 is in transit or otherwise within cellular coverage, it uses radio interface 510 to communicate with a central station and can report its location obtained using the GPS module 511. If GPS is unavailable, the mobile device 500 can report the location obtained from the cellular network. When a mobile device 500 is in a warehouse or other area with limited connectivity, the mobile device can rely on the base station to provide a location.

The invention is compatible with multiple setups of wireless connectivity and can have multiple wireless networks at the disposal of the mobile device 500. This allows the mobile device 500 to have backup options when one network fails. A mobile device 500 could have three networks: wireless (such as Wi-Fi®), cellular and GPS, or any combination of the foregoing. The choice of networks is variable according to a user's needs. Generally, the mobile device will use one radio interface for connectivity when it is in transit or otherwise available and not out of coverage.

When the mobile device is out of coverage, such as in a warehouse, it will use a separate radio interface to connect to a base station. However, in some embodiments, the same radio interface can be used for both the base station and in transit connectivity. The mobile device 500 is preferably able to maintain two way communication with at least one of its available networks. This way the central station can give the mobile device 500 commands. These commands can include a change in reporting schedule or an update to software or a variety of other options.

Mobile device 500 may also comprise a motion sensor 516. Motion could be used as a way to notify the mobile device 500 to power on certain antennas or interfaces such as 510 and 511. For instance, if a mobile device 500 is attached to a tank of oil and stored in a warehouse then the mobile device 500 may go into a sleep mode as dictated by its base station. Radio interface 515 may be kept powered on, but interfaces 510 and 511 may power down to conserve energy. If the tank is disturbed and/or moved then the motion sensor 516 can power on certain functionality as chosen by the user.

Figure 6:
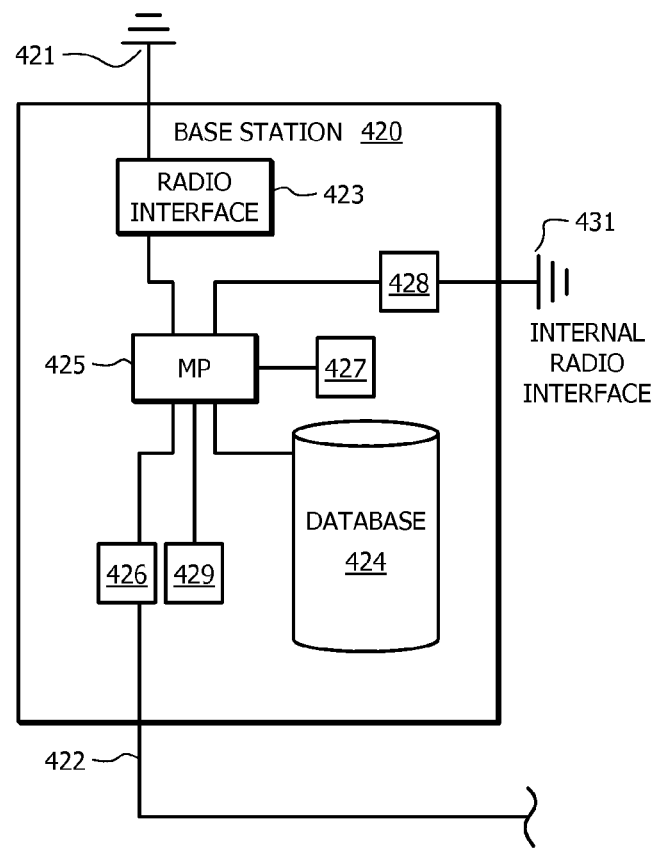
FIG. 6 is a block diagram of an embodiment of the base station of the invention.

FIG. 6 shows an embodiment of the base station 420 according to the invention. Base station 420 comprises a microprocessor 425, a memory 427, a database/storage 424 a radio interface 423, an antenna 421, power supply 429, a hard line interface 426, a hard line connection 422, and an internal radio interface 428 with antenna 431. Under a preferred embodiment, the internal radio interface 428 and antenna 431 communicate with mobile devices as described elsewhere in this specification. The radio interface 423 with antenna 421 (alternatively the hard line interface 426 and connection 422) connects the base station 420 to a communication network and a central station. The base station 420 records the mobile devices connected to it and stores records in its database 424. The geographical location of base station 420 is preferably coded into its hardware or software and the base station uses it geographical location when it's reporting the location of mobile devices to the central station. Alternatively, the base station 420 can additionally comprise a GPS module for determining location or use location services from another telecommunication network. Base station 420 may be capable of two way communications with both the central station and the mobile devices on its network. This way the base station can transmit communications from the mobile devices to the central station and can also transmit communication and commands from the central station to the mobile devices. For example, the central station may instruct the mobile devices to power off all communication modules except for the short range communications with the base station 420. The internal radio interface 428 will likely comprise a module for short range communications such as wireless (such as Bluetooth® or Wi-Fi®) but can comprise a variety of communication types including the ISM band, BHF, UHF and others. The radio interface 423 will likely comprise a cellular module or other long range communication system but a variety of communication systems are compatible with the invention. In one embodiment of the invention base station 420 mimics a mobile device such that the central station does not realize the mobile device is out of coverage. In another embodiment of the invention the base station 420 mimics the central station such that the mobile device does not realize that it is out of coverage. The communication interfaces 423, 428, and 426 may be able to be carried out by a single interface. Alternatively, the base station 420 may use more communication/radio interfaces than those illustrated. In certain embodiments the user may need to use further and alternative systems for communication. In some embodiments of the invention the base station 420 will largely serve as a pass through, transmitting data from central stations to mobile devices and vice versa. In other embodiments the base station 420 will play a larger role, managing the mobile devices on its network and maintaining a database of records of the mobile devices and desired location information. The antenna 421 may be located outside of the warehouse/mine/ other location where the base station 420 is located in order to provide communication with the preferred communication system. Alternatively the antenna 421 may be specially powered or configured to allow it to communicate with wireless networks that mobile devices cannot communicate with.

Figure 7:
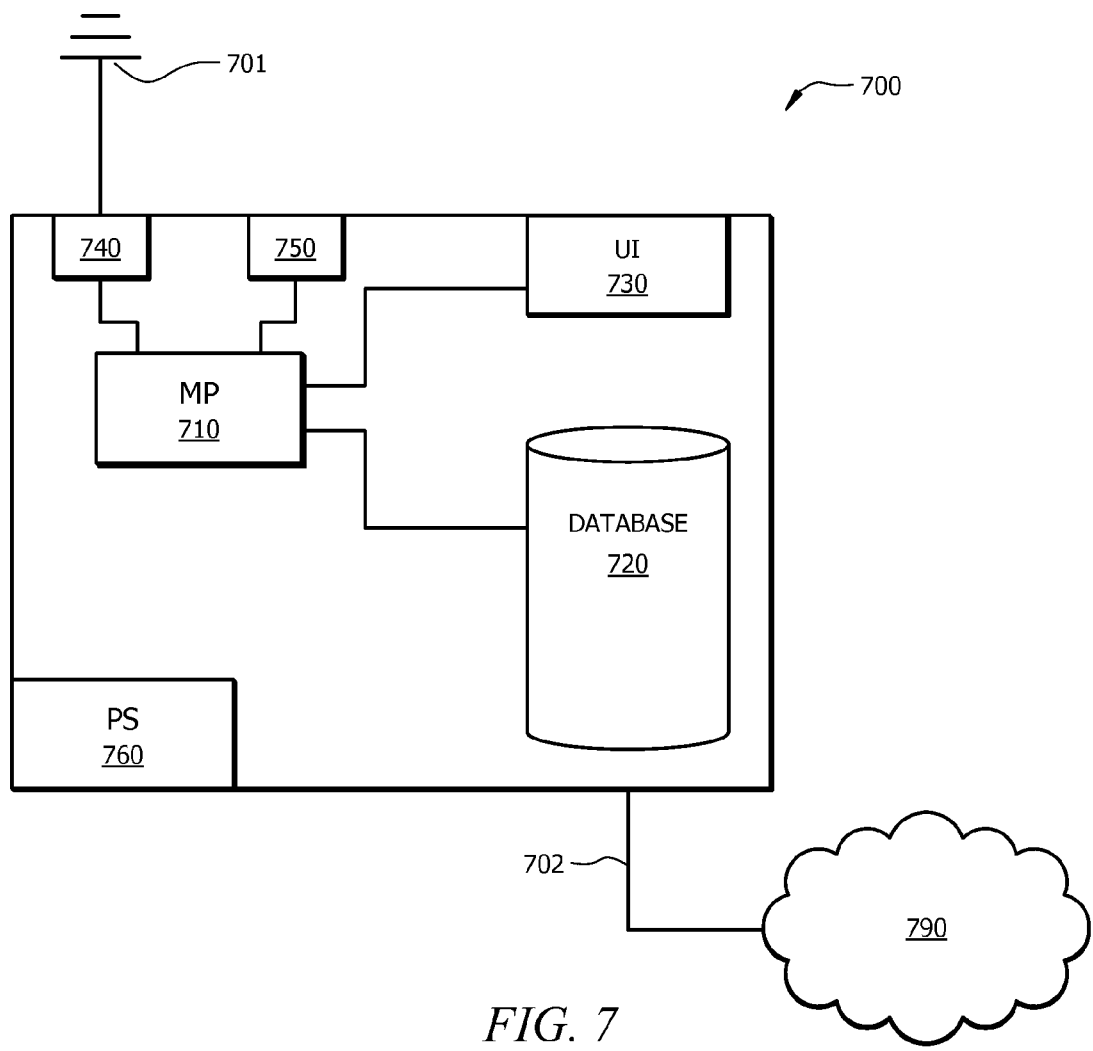
FIG. 7 is a block diagram of the central station in an embodiment of the invention.

An embodiment of the central station, seen in other figures, is shown in FIG. 7. Central station 700 allows the user to track the desired mobile devices. The central station 700 can be comprised of a computer, a server, a plurality of servers or a variety of configurations thereof. The central station communicates with base stations and mobile devices by means of radio interface 740 and antenna 701, hard line connection 702 to a network 790, or optional additional radio interface 750. The central station can further comprise microprocessor 710, database 720, power supply 760 and user interface 730. The microprocessor 710 manages the central station and can access and edit database 720 with information about the mobile devices and their location. The microprocessor 710 can also receive input from a user interface 730 such as a computer screen and keyboard or a touch-based interface such as that on a tablet. The user interface 730 allows users to access and view information in database 720 and to make edits and changes to mobile device commands and other network configurations. The radio interfaces 740 and 750 can comprise satellite or cellular communications modules, or a variety of other telecommunications systems as desired by the user. The mobile devices can be programmed to send their location to the central station 700 every hour, every day, or any interval chosen by the user. The central station 700 can also send commands to the mobile devices to change the interval or to power on/off various functionalities. Database 720 can maintain a list of mobile devices and their locations as well as other information like battery power, connection strength, motion sensor data, etc.

An additional embodiment of the invention can be on ships at sea. A user may wish to track inventory such as containers or tanks that are shipped by tankers or other ships. On the ocean there can be limited telecommunication connectivity either from a mobile device being located in the hull and unable to communicate outside of the ship, or from being so far out at sea that connectivity options are limited or have high power requirements. In this situation a user can place a base station on a ship to connect with mobile devices on that ship. The base station may have great communication capabilities due to possibly greater size, better power capabilities to communicate with satellites, or better antenna capabilities. In embodiments on ships the user can be able to track mobile devices as they are shipped across an ocean or sea, monitor progress, predict arrival times and track other data.

Figure 8:
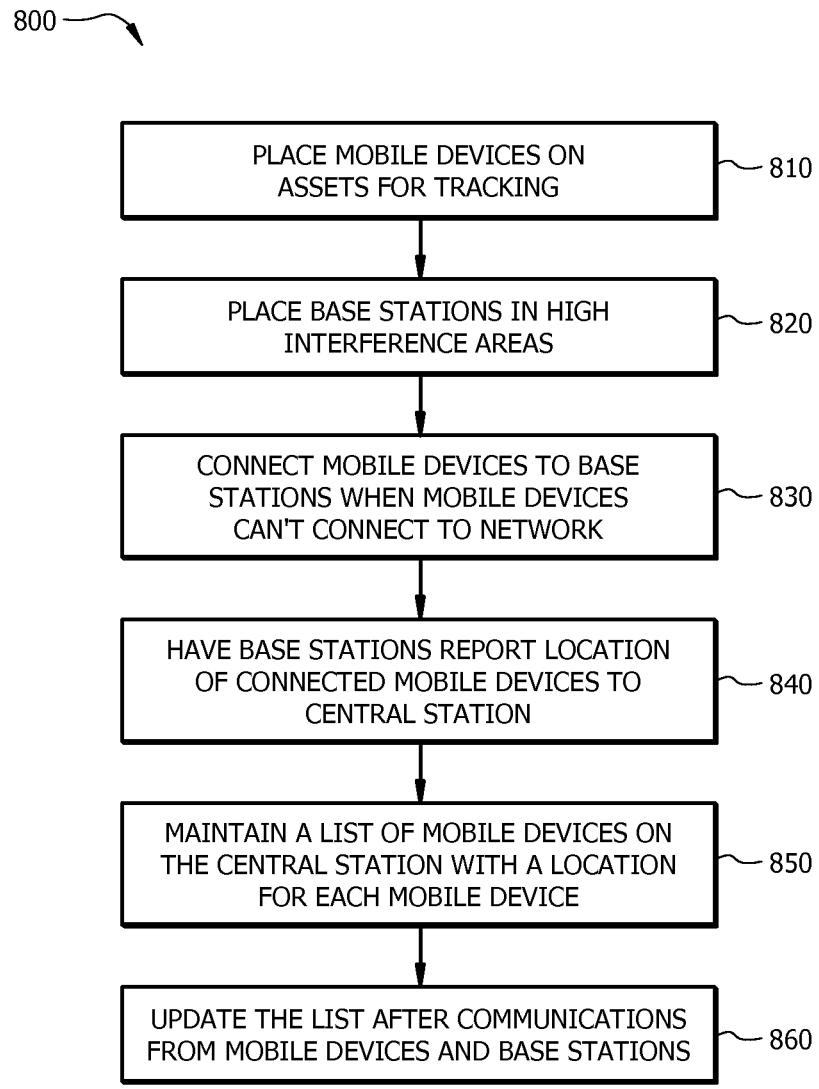
FIG. 8 is a flow chart of a process embodiment of the invention.

FIG. 8 shows a flow chart of an embodiment of the invention. As seen, mobile devices can be attached to assets that a user wishes to track by geolocation. Base stations would also be placed in areas of high interference, such as warehouses, and mobile devices could connect to the base stations when they are in these locations. The base station can then report the location of the connected mobile devices to the central station. The central station will maintain a list of mobile devices and their locations and the central station will update the list as mobile devices move around and report their new locations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system:
   a base station for tracking one or more mobile devices that is operable to communicate in first and second telecommunication standards, wherein the base station is disposed in an area where the one or more mobile devices are unable to communicate in the first telecommunication standard, and
   wherein the base station comprises:
      a memory operable to store a location and identity of the one or more mobile devices in communication with the base station; and
      a microprocessor operable to communicate with a central station in the first telecommunication standard, wherein the central station is operable to maintain a list of the one or more mobile devices and their locations, the microprocessor operable to communicate the identity and location of the one or more mobile devices connected to the base station to the central station, and further operable to communicate with the one or more mobile devices in the second telecommunication standard,
      wherein the one or more mobile devices is operable to transmit its location to the central station in the first telecommunication standard, and further operable to communicate with the base station in the second telecommunication standard when the one or more mobile devices are in the area where they are unable to communicate in the first telecommunication standard,
      wherein the one or more mobile devices comprise a first radio interface to communicate with the central station in the first telecommunication standard, a second radio interface to communicate with the base station in the second telecommunication standard, and a motion sensor,
      wherein when any one of the one or more mobile devices connects to the base station, the mobile device enters a power saving mode for which the first radio interface is powered off, and
      wherein when the motion sensor of the mobile device detects a motion during operation of the mobile device in the power saving mode, the mobile device exits the power saving mode and the first radio interface is powered on.

2. The base station of claim 1 wherein the area comprises a a warehouse.

3. The base station of claim 1 wherein the area comprises a a mine.

4. The base station of claim 1 wherein the first telecommunication standard is a cellular and the second telecommunication standard is an Institute of Electrical and Electronics Engineers' (IEEE) 802.11 standard.

5. The base station of claim 1 wherein at least one mobile device is attached to a truck.

6. The base station of claim 1 wherein the first communications interface is a hard line connection.

7. The base station of claim 1 wherein the location of the base station is coded into the software of the base station.

8. The base station of claim 1 wherein the base station mimics the central station to the one or more mobile devices and mimics the one or more mobile devices to the central station.

9. A system to track devices, comprising:
   a plurality of mobile devices comprising: a microprocessor, a first radio interface that is configured to communicate in a cellular telecommunication standard, a second radio interface that is configured to communicate in a non-cellular telecommunication standard, and a motion sensor,
      wherein the plurality of mobile devices are operable to transmit their location directly to a cellular base station over a cellular network via the first radio interface, and further operable to communicate in the non-cellular telecommunications standard via the second radio interface when the plurality of mobile devices are in an area where they are unable to communicate in the cellular communication standard;
   at least one base station comprising a communications interface, a microprocessor, and a database,
      wherein the at least one base station is operable to: communicate with the plurality of mobile devices in the non-cellular telecommunications standard, communicate over a communication network, maintain a list of one or more of the plurality of mobile devices that are in communication with the at least one base station, and communicate the list over the communication network,
      wherein when any one mobile device of the plurality of mobile devices connects to the at least one base station, the mobile device enters a power saving mode in which the first radio interface of the mobile device is powered off, and
      wherein when a motion is detected by the motion sensor during operation of the mobile device in the power saving mode, the mobile device exits the power saving mode and powers on the first radio interface;
   a central station comprising a microprocessor, a network connection, and a database, wherein the central station is operable to receive the location of the plurality of mobile devices from the cellular base station and track their location(s), and further operable to communicate with the at least one base station over the communication network and track the mobile devices in communication with the at least one base station.

10. The system of claim 9 wherein the area comprises a warehouse.

11. The system of claim 9 wherein the area comprises a mine.

12. The system of claim 9 wherein the first radio interface is a cellular interface.

13. The system of claim 9 wherein at least one mobile device is attached to a truck.

14. The system of claim 9 wherein the at least one base station further comprises a hard line connection.

15. The system of claim 9 wherein the location of the at least one base station is coded into the software of the at least one base station.

16. The system of claim 9 wherein the at least one base station mimics the central station to the at least one mobile device and mimics the at least one mobile device to the central station.

17. A method for tracking devices, comprising;
placing a plurality of mobile devices on items to be tracked, the mobile devices operable to communicate in first and second telecommunication standards, and operable to transmit their location in the first telecommunication standard to a base station of the first telecommunication standard for the purpose of sending their location to a central station and to communicate with one or more base stations of the second telecommunication standard when the plurality of mobile devices enter an area where they are unable to communicate in the first communication standard, wherein the plurality of mobile devices include a first radio interface to communicate with the central station in the first telecommunication standard, a second radio interface to communicate with the one or more base stations in the second telecommunication standard, and a motion sensor, wherein when at least one mobile device of the plurality of mobile devices connects to the one or more base stations of the second telecommunication standard, the at least one mobile device enters a power saving mode in which the first radio interface is powered off, and wherein when a motion is detected by the motion sensor during operation of the at least one mobile device in the power saving mode, the at least one mobile device exits the power saving mode and powers on the first radio interface;

placing the one or more base stations in the area, the one or more base stations operable to transmit the location of the plurality of mobile devices to the central station;

storing a list of the plurality of mobile devices and their locations at the central station, the central station operable to receive communications from the plurality of mobile devices and the one or more base stations comprising updated location information, and operable to update the list.

\* \* \* \* \*